US012135062B2

United States Patent
Tang et al.

(10) Patent No.: US 12,135,062 B2
(45) Date of Patent: Nov. 5, 2024

(54) DUAL MOTOR POWER UNIT SHAFT COUPLER

(71) Applicant: FORD GLOBAL TECHNOLOGIES, LLC, Dearborn, MI (US)

(72) Inventors: Xiaoduan Tang, Livonia, MI (US); David Allen Janson, Plymouth, MI (US); Steven Anatole Frait, Milan, MI (US); Gregory Daniel Goleski, Rochester Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 18/109,350

(22) Filed: Feb. 14, 2023

(65) Prior Publication Data

US 2024/0271667 A1  Aug. 15, 2024

(51) Int. Cl.
*F16D 27/118* (2006.01)
*B60K 1/02* (2006.01)

(52) U.S. Cl.
CPC .............. *F16D 27/118* (2013.01); *B60K 1/02* (2013.01)

(58) Field of Classification Search
CPC .............. B60K 1/02; B60K 2007/0092; F16D 27/10–118; F16H 48/24
See application file for complete search history.

(56) References Cited

U.S. PATENT DOCUMENTS

| | | | |
|---|---|---|---|
| 3,307,666 A * | 3/1967 | Miller | F16D 27/09 192/114 R |
| 3,669,231 A * | 6/1972 | Schindel | F16D 23/02 192/84.92 |
| 4,010,832 A * | 3/1977 | Puro | F16D 27/118 192/84.92 |
| 6,237,737 B1 * | 5/2001 | Jorgensen | H02K 7/1163 192/84.92 |
| 6,524,191 B1 | 2/2003 | Tennies | |
| 7,399,248 B2 | 7/2008 | Kleinhans et al. | |
| 8,167,764 B2 | 5/2012 | Balenda et al. | |
| 11,180,013 B1 * | 11/2021 | Yu | B60K 17/06 |
| 11,198,359 B2 | 12/2021 | Payne | |
| 11,242,888 B2 | 2/2022 | Franzino | |

(Continued)

FOREIGN PATENT DOCUMENTS

CN     110154723 A  *  8/2019
CN     114228462 A  *  3/2022

*Primary Examiner* — Stacey A Fluhart
*Assistant Examiner* — James J Taylor, II
(74) *Attorney, Agent, or Firm* — Vincent Mastrogiacomo; Brooks Kushman P.C.

(57) ABSTRACT

A shaft coupler having first and second spindles adapted to be secured to a first and second output shafts of first and second motors, respectively. A locker ring is assembled to the first spindle, and a locker carrier is assembled to the second spindle. A coil is carried by the locker carrier and switches between an energized state wherein the coil shifts the locker ring to slide into engagement with the second spindle to lock the first and second output shafts together, and a deenergized state wherein a spring biases the locker ring out of engagement with the second spindle to unlock the first and second output shafts from each other. A first set of locking teeth are disengaged from a second set of locking teeth when the coil is deenergized, and are engaged when the coil is energized.

18 Claims, 2 Drawing Sheets

(56) References Cited

U.S. PATENT DOCUMENTS

2006/0037792 A1* 2/2006 Boss .................... B60L 3/0061
                                                                                            180/65.6
2020/0132180 A1* 4/2020 Tsuzuki .................. B60K 1/00

* cited by examiner

DUAL MOTOR POWER UNIT SHAFT COUPLER

TECHNICAL FIELD

This disclosure relates to a shaft coupler that locks the output shafts of two motors together to transfer torque from one output shaft to the other output shaft.

BACKGROUND

Off-road vehicles with increased torque output are desired by off-road enthusiasts to overcome obstacles. One way to provide a substantial increase in torque is to combine the torque output of two motors. Installing two motors in the engine compartment of a vehicle takes up considerable space and limits the space available for other components.

This disclosure is directed to solving the above problems and other problems as summarized below.

SUMMARY

According to one aspect of this disclosure, an apparatus is disclosed for coupling two output shafts of two motors of a vehicle. A first motor has a first output shaft and a second motor has a second output shaft that is independent from the first output shaft. A coupler includes a first spindle secured to the first output shaft and a second spindle secured to the second output shaft. A locker ring is assembled to the first spindle, and a locker carrier is assembled to the second spindle. A coil is carried by the locker carrier that is controlled by a controller to switch between an energized state wherein the coil shifts the locker ring to slide into engagement with the second spindle to lock the first and second output shafts together and a deenergized state wherein a spring biases the locker ring out of engagement with the second spindle to unlock the first and second output shafts from each other.

Other alternative aspects of the apparatus comprise a first set of locking teeth provided on the locker ring, and a second set of locking teeth provided on the second spindle that face the first set of locking teeth. The first set of locking teeth are disengaged from the second set of locking teeth when the coil is deenergized. The first set of locking teeth are engaged with the second set of locking teeth when the coil is energized. A gap is defined between the locker ring and the coil, and a space corresponding to the size of the gap is defined between the first set of locking teeth and the second set of locking teeth. The coil shifts the locker ring to close the gap in the energized state and cause the first set of locking teeth to engage the second set of locking teeth and close the space therebetween.

The locker carrier is attached to a housing, and the first spindle is rotatable relative to the locker carrier and the housing when the coil is deenergized. The first spindle is locked to the second spindle when the coil is energized, and the second spindle rotates with the first spindle and relative to the housing and locker carrier when the coil is energized. The housing, the locker carrier, and coil remain stationary whether the coil is energized or deenergized. Only the locker ring shifts toward and away from the coil when the coil is energized and deenergized.

The apparatus further comprises a first bearing ring provided between the first spindle that is rotatable relative to the housing, and a second bearing ring provided between the second spindle that is rotatable relative to the housing.

The apparatus further comprises an outer ring that rotates with the locker ring that is shiftable relative to the outer ring toward and away from the coil. A first thrust bearing is assembled between the outer ring and the locker carrier that facilitates rotation of the locker carrier relative to the locker ring when the coil is deenergized. A second thrust bearing is provided between the second spindle and the locker carrier that facilitates rotation of the locker carrier relative to the second spindle.

According to another aspect of this disclosure, a shaft coupler is disclosed. The shaft coupler includes a first spindle adapted to be secured to a first output shaft of a first motor, and a second spindle adapted to be secured to a second output shaft of a second motor. A locker ring is assembled to the first spindle, and a locker carrier is assembled to the second spindle. A coil is carried by the locker carrier and is controlled by a controller. The coil switches between an energized state wherein the coil shifts the locker ring to slide into engagement with the second spindle to lock the first and second output shafts together, and a deenergized state wherein a spring biases the locker ring out of engagement with the second spindle to unlock the first and second output shafts from each other. A first set of locking teeth is provided on the locker ring, and a second set of locking teeth is provided on the second spindle that face the first set of locking teeth. The first set of locking teeth are disengaged from the second set of locking teeth when the coil is deenergized, and the first set of locking teeth are engaged with the second set of locking teeth when the coil is energized.

The locker carrier of the shaft coupler is attached to a housing. The first spindle is rotatable relative to the locker carrier and the housing when the coil is deenergized, and the first spindle is locked to the second spindle when the coil is energized. The second spindle rotates with the first spindle and relative to the housing and locker carrier when the coil is energized.

The housing, the locker carrier, and coil of the shaft coupler remain stationary whether the coil is energized or deenergized. The locker ring is the only part of the shaft coupler that shifts toward and away from the coil when the coil is energized and deenergized.

A first bearing ring is provided between the first spindle and a housing, and a second bearing ring is provided between the second spindle and the housing, wherein the first spindle and the second spindle are rotatable relative to the housing.

An outer ring rotates with the locker ring, and the locker ring is shiftable relative to the outer ring toward and away from the coil. A first thrust bearing is assembled between the outer ring and the locker carrier that facilitates rotation of the locker carrier relative to the locker ring when the coil is deenergized. A second thrust bearing is provided between the second spindle and the locker carrier that facilitates rotation of the locker carrier relative to the second spindle.

According to another aspect of this disclosure, a vehicle is disclosed that has a first motor having a first output shaft, and a second motor having a second output shaft. A first spindle is secured to the first output shaft of the first motor. A second spindle is secured to the second output shaft of the second motor. A locker ring is assembled to the first spindle, and a locker carrier is assembled to the second spindle. A coil is carried by the locker carrier that is controlled by a controller to switch between an energized state wherein the coil shifts the locker ring to slide into engagement with the second spindle to lock the first and second output shafts together, and a deenergized state wherein a spring biases the locker ring out of engagement with the second spindle to unlock the first and second output shafts from each other. A first set of locking teeth is provided on the locker ring, and a second set of locking teeth is provided on the second spindle that face the first set of locking teeth. The first set of locking teeth are disengaged from the second set of locking teeth when the coil is deenergized, and the first set of locking teeth are engaged with the second set of locking teeth when the coil is energized. A gap is defined between the locker ring and the coil, and a space corresponding to the size of the gap is defined between the first set of locking teeth and the second set of locking teeth. The coil shifts the locker ring to close the gap in the energized state and cause the first set of locking teeth to engage the second set of locking teeth closing the space therebetween. The locker carrier is attached to a housing, and the first spindle is rotatable relative to the locker carrier and the housing when the coil is deenergized. The first spindle is locked to the second spindle when the coil is energized, and the second spindle rotates with the first spindle and relative to the housing and locker carrier when the coil is energized. The housing, the locker carrier, and coil remain stationary whether the coil is energized or deenergized.

According to other aspects of the vehicle, the locker ring shifts toward and away from the coil when the coil is energized and deenergized.

A first bearing ring is provided between the first spindle and a housing, and a second bearing ring is provided between the second spindle and the housing, wherein the first spindle and the second spindle are rotatable relative to the housing.

The above aspects of this disclosure and other aspects will be described below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale, and some features may be exaggerated or minimized to show details of particular components. The specific structural and functional details disclosed are not to be interpreted as limiting, but as a representative basis for teaching one skilled in the art how to practice the disclosed concepts.

Various features illustrated and described with reference to any one of the figures may be combined with features illustrated in one or more of the other figures to produce embodiments that are not explicitly illustrated or described. The combinations of features illustrated provide representative embodiments for typical applications. Various combinations and modifications of the features consistent with the teachings of this disclosure could be used in particular applications or implementations.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
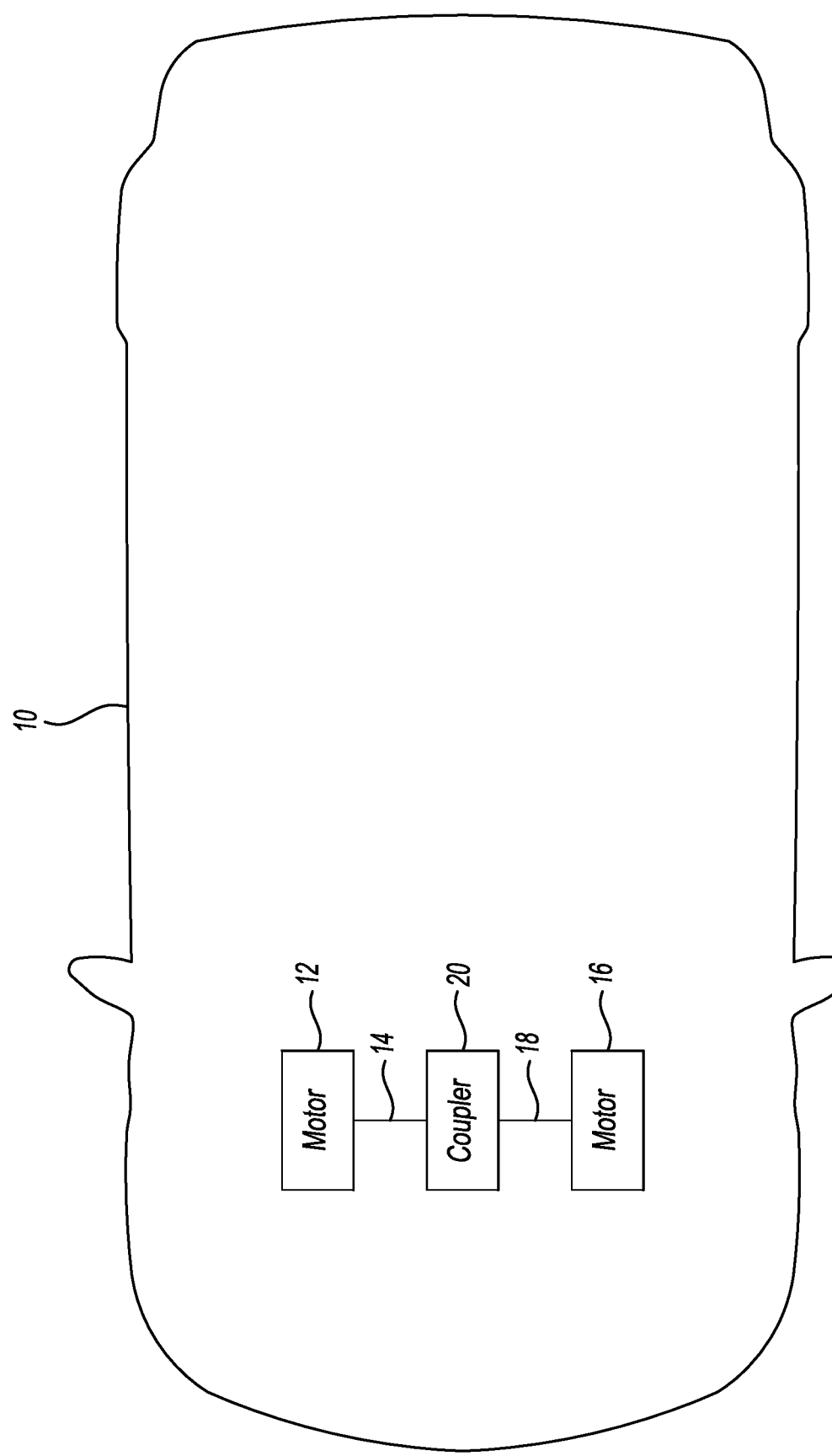
FIG. 1 is a diagrammatic view showing a vehicle including two motors joined together by a locking shaft coupler.

Referring to FIG. 1, a vehicle 10 is depicted diagrammatically that includes a first motor 12 having a first output shaft 14 and a second motor 16 having a second output shaft 18. The shaft coupler 20 functions to selectively couple the output shafts 14 and 18 together to provide torque from one or both output shafts to the half shafts 26 and 28. The shaft coupler 20 may be packaged within a narrow axial space between the first motor 12 and the second motor 16 because it has a relatively short axial length. The short axial length of the shaft coupler 20 allows half shafts to be provided that reduce the angle and the length of the half shafts 26 and 28. In addition, the coupler 20 is a single, self-contained assembly that can be bolted between the first motor 12 and the second motor 16.

Figure 2:
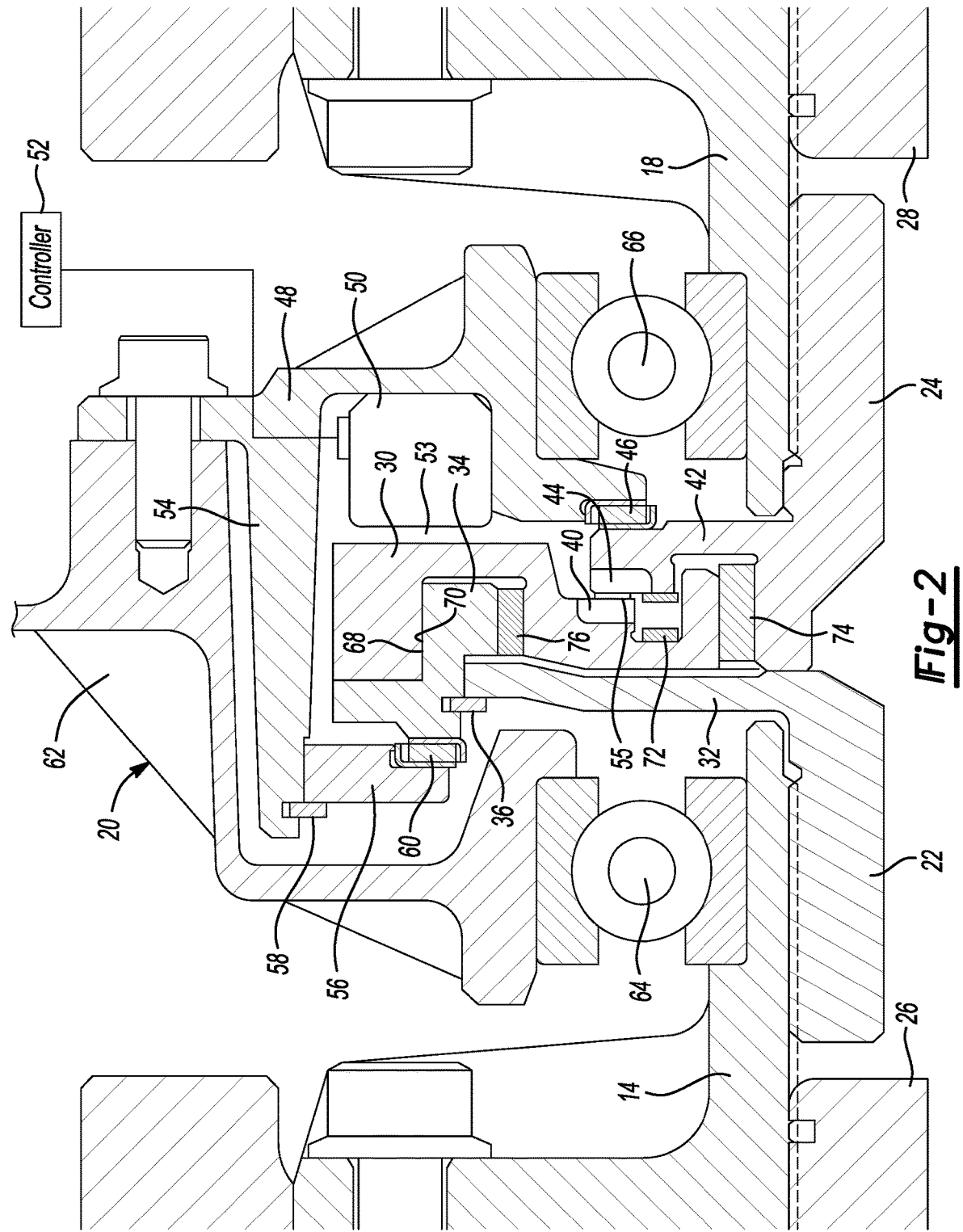
FIG. 2 is a cross-section view of a locking shaft coupler for a drivetrain that couples the output shafts of two motors.

Referring to FIG. 2, a shaft coupler 20 includes a first spindle 22 and a second spindle 24 that are adapted to be connected to the first output shaft 14 and the second output shaft 18. A first half shaft 26 is connected to the first output shaft 14 and a second half shaft 28 is connected to the second output shaft 18. The half shafts 26 and 28 are each connected to a wheel (not shown) of the vehicle 10.

The first spindle 22 engages the locker ring 30 indirectly with a first radial flange 32 that extends radially outwardly toward the outer ring 34. The radially extending flange 32 is held to the outer ring 34 with a snap ring 36. The outer ring 34 is connected to the locker ring 30 with a spline connection that guides the movement of the locker ring 30 in an axial direction. The locker ring includes a first set of teeth 40 that is provided on a radially extending surface of the locker ring 30.

The second spindle 24 includes a second radial flange 42 that includes a second set of teeth 44 that is oriented to face the first set of teeth 40 on the locker ring 30. A thrust bearing 46 is disposed between the second spindle 24 and a locker carrier 48 to facilitate rotation of the second spindle relative to the locker carrier 48. The locker carrier 48 supports a coil 50 that is controlled by a controller 52 that controls energizing and deenergizing the coil 50 to shift the locker ring 30 in the axial direction on the outer ring 34. A gap 53 is defined axially between the coil 50 and the locker ring 30. A space 55 corresponding to the size of the gap 53 is defined between the first and second sets of teeth 40 and 44. When the locker ring 30 is energized, the first set of teeth 40 are shifted into engagement with the second set of teeth 44 and torque produced by the first motor 12 and the second motor 16 is combined to double the torque provided to one of the wheels. In off-road driving, providing increased torque to one wheel when one wheel is slipping allows the vehicle 10 to overcome obstacles and slippery road conditions.

The locker carrier 48 includes an axial flange 54 that extends axially and radially outboard of the locker ring 30 to a backing plate 56. The backing plate 56 is held on the axial flange 54 of the locker carrier 48 with a snap ring 58 and is held against a thrust bearing 60 disposed between the backing plate 56 and the outer ring 34. The outer ring 34 rotates with the first spindle 22, and the locker ring 30.

The locker carrier 48 is attached to the housing 62 of the shaft coupler 20 with a bolt and forms part of the housing 62. A first bearing ring 64 and a second bearing ring 66 are supported on the first spindle 22 and the second spindle 24, respectively. The first output shaft 14 and second output shaft 18 are rotatable and rotate relative to the shaft coupler 20 housing 62. The first bearing ring 64 and the second bearing ring 66 facilitate rotation of the first spindle 22 and the second spindle 24 within the shaft coupler 20.

A splined connection 68 is provided between the outer ring 34 and the locker ring 30 on a mating axial surfaces 70 thereof.

A wave spring 72 is disposed between the locker ring 30 and the second radial flange 42 of the second spindle 24. The wave spring 72 biases the locker ring 30 away from the second radial flange 42 of the second spindle 24. The biasing force of the wave spring 72 is overcome when the coil is energized allowing the locker ring 30 to lock the first spindle 22 and the second spindle 24 together to provide additional torque to one wheel. When the coil is not energized, the wave spring causes the locker ring 30 to return to its disengaged position with the first set of teeth 40 to disengage the second set of teeth.

An inner bushing 74 is provided between the second spindle 24 and the locker ring 30. An outer bushing 76 is provided between the outer ring 34 and the locker ring 30. It is anticipated that one of the bushings 74 and 76 may be eliminated.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and includes modifications of the illustrated embodiments. In addition, the features of various implementing embodiments may be combined to form further embodiments of the invention.

What is claimed is:

1. An apparatus comprising:
    a first motor having a first output shaft;
    a second motor having a second output shaft that is independent from the first output shaft; and
    a coupler including—
        a first spindle secured to the first output shaft,
        a second spindle secured to the second output shaft,
        a locker ring assembled to an outer ring with a spline connection, wherein the outer ring is secured to a first radially extending flange of the first spindle,
        a locker carrier assembled to the second spindle with a thrust bearing disposed between the locker carrier and a second radially extending flange of the second spindle,
        a housing non-rotatably supporting the locker carrier, wherein the housing includes a portion extending to a bearing on an opposite side of the first radially extending flange of the first spindle relative to the second radially extending flange to facilitate rotation of the first spindle;
        a first set of teeth disposed on the locker ring,
        a second set of teeth disposed on the second radially extending flange facing the first set of teeth; and
        a coil carried by the locker carrier, wherein the coil is controlled by a controller to switch between an energized state wherein the coil shifts the locker ring relative to the outer ring via the spline connection to slide the first set of teeth into engagement with the second set of teeth to lock the first and second output shafts together and a deenergized state wherein a spring biases the first set of teeth out of engagement with the second set of teeth to disengage the first and second output shafts from each other.

2. The apparatus of claim 1 wherein a gap is defined between the locker ring and the coil, and wherein a space corresponding to a size of the gap is defined between the first set of teeth and the second set of teeth.

3. The apparatus of claim 2 wherein the coil shifts the locker ring to close the gap in the energized state and cause the first set of teeth to engage the second set of teeth and close the space therebetween.

4. The apparatus of claim 1 wherein the locker carrier is attached to the housing, wherein the first spindle is rotatable relative to the locker carrier and the housing when the coil is deenergized, wherein the first spindle is locked to the second spindle when the coil is energized, and wherein the second spindle rotates with the first spindle and relative to the housing and the locker carrier when the coil is energized.

5. The apparatus of claim 4 wherein the housing, the locker carrier and the coil remain stationary whether the coil is energized or deenergized.

6. The apparatus of claim 4 wherein only the locker ring shifts toward and away from the coil when the coil is energized and deenergized.

7. The apparatus of claim 1 further comprising:
    the bearing is a first bearing ring provided between the first spindle and the housing, and a second bearing ring is provided between the second spindle and the housing, wherein the first spindle and the second spindle are rotatable relative to the housing.

8. The apparatus of claim 1 further comprising:
    a first thrust bearing is assembled between the outer ring and the locker carrier that facilitates rotation of the locker carrier relative to the locker ring when the coil is deenergized and the thrust bearing is a second thrust bearing provided between the second spindle and the locker carrier that facilitates rotation of the locker carrier relative to the second spindle.

9. A shaft coupler comprising:
    a first spindle adapted to be secured to a first output shaft of a first motor;
    a second spindle adapted to be secured to a second output shaft of a second motor;

a locker ring assembled to an outer ring with a spline connection, wherein the outer ring is secured to a first radially extending flange of the first spindle;

a locker carrier assembled to the second spindle with a thrust bearing disposed between the locker carrier and a second radially extending flange of the second spindle;

a housing non-rotatably supporting the locker carrier, wherein the housing includes a portion extending to a bearing on an opposite side of the first radially extending flange of the first spindle relative to the second radially extending flange to facilitate rotation of the first spindle;

a coil carried by the locker carrier, wherein the coil is controlled by a controller to switch between an energized state wherein the coil shifts the locker ring relative to the outer ring via the spline connection to slide a first set of locking teeth into engagement with a second set of locking teeth to lock the first and second output shafts together and a deenergized state wherein a spring biases the locker ring out of engagement with the second spindle to unlock the first and second output shafts from each other;

the first set of locking teeth provided on the locker ring; and the second set of locking teeth provided on the second spindle that face the first set of locking teeth, wherein the spring disengages the first set of locking teeth from the second set of locking teeth when the coil is deenergized, and wherein the first set of locking teeth engage the second set of locking teeth when the coil is energized.

10. The shaft coupler of claim 9 wherein the locker carrier is attached to the housing, wherein the first spindle is rotatable relative to the locker carrier and the housing when the coil is deenergized, wherein the first spindle is locked to the second spindle when the coil is energized, and wherein the second spindle rotates with the first spindle and relative to the housing and the locker carrier when the coil is energized.

11. The shaft coupler of claim 10 wherein the housing, the locker carrier and the coil remain stationary whether the coil is energized or deenergized.

12. The shaft coupler of claim 9, wherein only the locker ring shifts toward and away from the coil via the spline connection when the coil is energized and deenergized.

13. The shaft coupler of claim 9 further comprising:
the bearing is a first bearing ring provided between the first spindle and the housing, and a second bearing ring is provided between the second spindle and the housing, wherein the first spindle and the second spindle are rotatable relative to the housing.

14. The shaft coupler of claim 9 further comprising:
a first thrust bearing is assembled between the outer ring and the locker carrier that facilitates rotation of the locker carrier relative to the locker ring when the coil is deenergized and the thrust bearing is a second thrust bearing provided between the second spindle and the locker carrier that facilitates rotation of the locker carrier relative to the second spindle.

15. A vehicle comprising:
a first motor having a first output shaft;
a second motor having a second output shaft;
a first spindle secured to the first output shaft of the first motor;
a second spindle secured to the second output shaft of the second motor;
a locker ring assembled to an outer ring with a spline connection, wherein the outer ring is assembled to a first radially extending flange of the first spindle;
a locker carrier assembled to the second spindle with a thrust bearing disposed between the locker carrier and a second radially extending flange of the second spindle;
a housing non-rotatably supporting the locker carrier, wherein the housing includes a portion extending to a bearing on an opposite side of the first radially extending flange of the first spindle relative to the second radially extending flange to facilitate rotation of the first spindle;
a coil carried by the locker carrier, wherein the coil is controlled by a controller to switch between an energized state wherein the coil shifts the locker ring relative to the outer ring via the spline connection to slide a first set of locking teeth into engagement with a second set of locking teeth to lock the first and second output shafts together and a deenergized state wherein a spring biases the first set of locking teeth out of engagement with the second set of locking teeth to disengage the first and second output shafts from each other;
the first set of locking teeth provided on the locker ring;
the second set of locking teeth provided on the second radially extending flange that face the first set of locking teeth, wherein the first set of locking teeth are disengaged from the second set of locking teeth when the coil is deenergized, and wherein the first set of locking teeth are engaged with the second set of locking teeth when the coil is energized; and
a gap is defined between the locker ring and the coil, and a space corresponding to a size of the gap is defined between the first set of locking teeth and the second set of locking teeth, wherein the coil shifts the locker ring to close the gap in the energized state and cause the first set of locking teeth to engage the second set of locking teeth and close the space therebetween, wherein the locker carrier is attached to the housing, wherein the first spindle is rotatable relative to the locker carrier and the housing when the coil is deenergized, wherein the first spindle is locked to the second spindle when the coil is energized, and wherein the second spindle rotates with the first spindle and relative to the housing and the locker carrier when the coil is energized, wherein the housing, the locker carrier and the coil remain stationary whether the coil is energized or deenergized.

16. The vehicle of claim 15 wherein only the locker ring shifts toward and away from the coil when the coil is energized and deenergized.

17. The vehicle of claim 15 further comprising:
the bearing is a first bearing ring is provided between the first spindle and the housing, and a second bearing ring is provided between the second spindle and the housing, wherein the first spindle and the second spindle are rotatable relative to the housing.

18. The vehicle of claim 15 wherein the housing contains the first spindle, the second spindle, the locker ring, the outer ring, and the locker carrier in a single, self-contained assembly.

* * * * *